ALTERABLE READ-ONLY STORAGE DEVICE

Filed May 6, 1964

INVENTORS.
DONALD R. FAULIS
ROBERT B. WHITSON
Vincent L. Carney
ATTORNEY

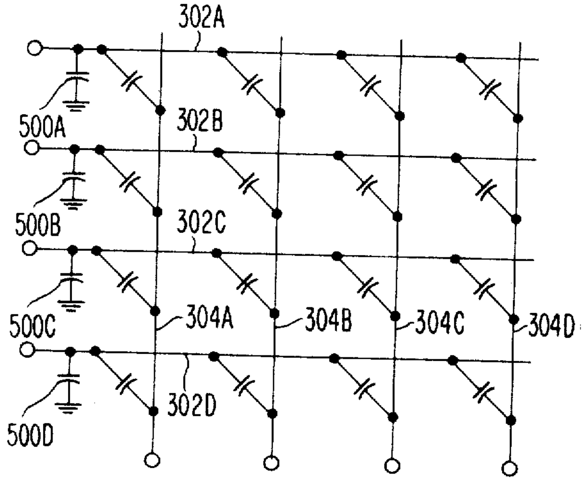
Fig.5
| INHIBIT CURRENT<br>1 = CURRENT<br>0 = NO CURRENT<br>INHIBIT LINES | | | | WORD SELECTED |
|---|---|---|---|---|
| 602A | 602B | 602C | 602D | |
| 0 | 1 | 0 | 1 | A |
| 1 | 0 | 0 | 1 | B |
| 0 | 1 | 1 | 0 | C |
| 1 | 0 | 1 | 0 | D |
Fig.7
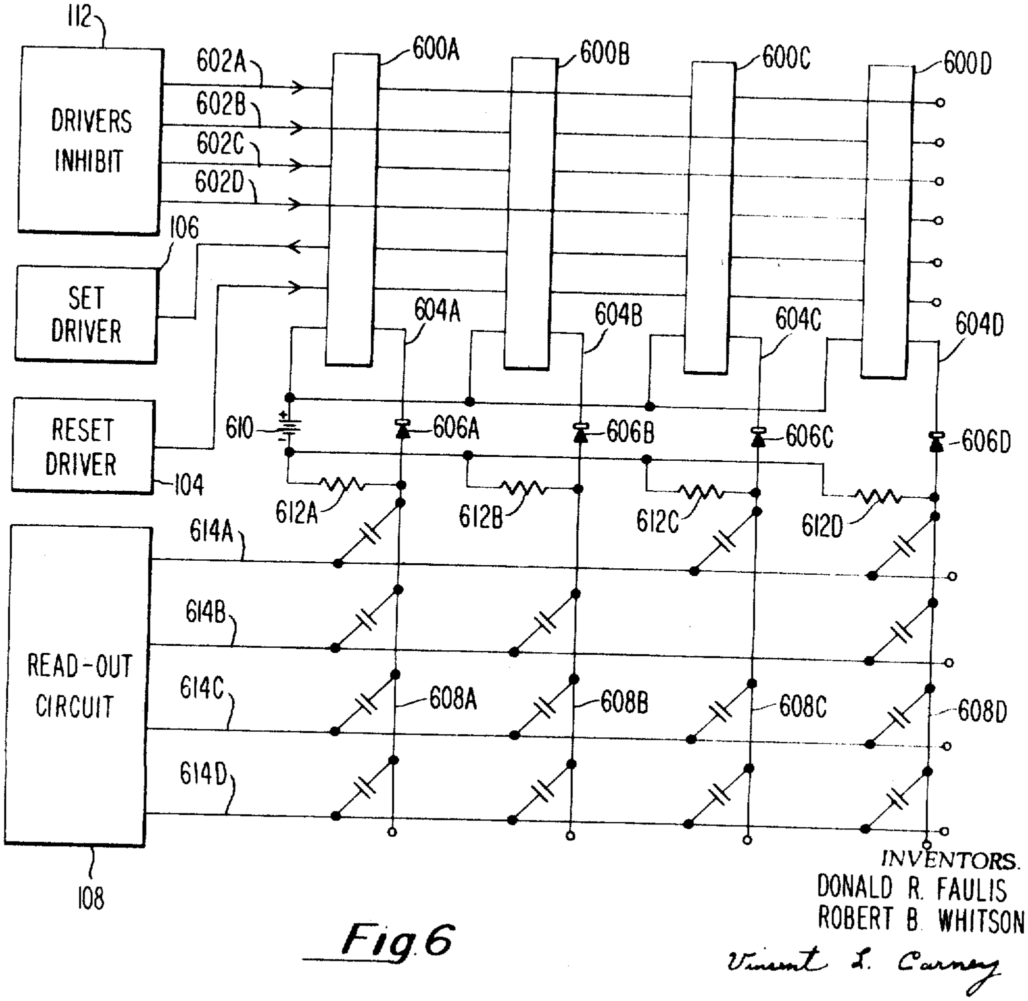
Fig.6
INVENTORS.
DONALD R. FAULIS
ROBERT B. WHITSON
Vincent L. Carney
ATTORNEY Oct. 31, 1967 D. R. FAULIS ET AL 3,350,691

ALTERABLE READ-ONLY STORAGE DEVICE

Filed May 6, 1964

3 Sheets-Sheet 3

INVENTOR
DONALD R. FAULIS
ROBERT B. WHITSON

Vincent L. Carney
ATTORNEY 3,350,691
ALTERABLE READ-ONLY STORAGE DEVICE
Donald R. Faulis, Norristown, Pa., and Robert B. Whitson, Baltimore, Md., assignors to Burroughs Corporation, Detroit, Mich., a corporation of Michigan
Filed May 6, 1964, Ser. No. 365,277
3 Claims. (Cl. 340—172.5)

This invention relates to semi-permanent memories, and more particularly, to a system for obtaining an improved read-out from semi-permanent memories.

Some memories, called semi-permanent or read-out only memories, are able to store information for indefinite periods of time. The information may be stored, for example, in the form of a binary code through a plug board connected to a diode decoder. Another system for storing such information is the use of selectively positioned capacitors which together form a binary code. In each of these systems the code will last indefinitely and yet the information in the memory may be readily changed or replaced.

The use of plug boards and diode decoders is expensive and complicated. Moreover, plug boards require the use of contacts, which often cause difficulties due to dirt accumulation between mating parts. The use of capacitors which are punched into cards is cheaper and simpler, but it is difficult to obtain a satisfactory read-out from the capacitors. Accordingly, it is an object of this invention to provide an improved semi-permanent storage technique.

It is a further object of this invention to provide a simple, economical form of semi-permanent storage in which the read-out signals are of sufficient amplitude to be readily distinguishable from noise.

It is a still further object of this invention to provide an improved system for detecting the presence of a bit of information stored in the form of a reactive element.

In accordance with the above objects a memory is provided having a plurality of parallel word lines and a plurality of parallel sense lines perpendicular to the word lines. A storage card is placed between the word lines and the sense lines which form a matrix. At each intersection of the matrix between the word lines and the sense lines a bit of information may be stored on the information card. This information is stored by punching a hole in the card at the intersection. This hole creates an increased capacitance between the word line and the sense line. This increased capacitance may represent a binary "one" and the absence of such a punched hole at an intersection of a word line and a sense line may represent a binary "zero."

The information stored in this memory is read-out by applying voltage pulses to the word lines. The sense lines are electrically connected to an amplifier having a low input impedance. At intersections of a word line and a sense line the input voltage is either coupled to the sense line through a punched hole or prevented from coupling by a shield. The increased capacitance between the word line and the sense line cooperates with the low input impedance of the sensing amplifier to create a capacitor-resistor differentiator. Consequently, the input pulse is differentiated at intersections of the word lines and sense lines where there is a punched hole, but is not differentiated over intersections where no hole is punched in the dielectric card. A current amplitude discriminator determines which of the input pulses received by the sense lines are differentiated pulses so as to indicate a binary "one." These indications are stored by a tunnel diode register and indicated by an indicating device.

The invention and the above-noted and other features thereof will be understood more clearly and fully from the following detailed description when considered with reference to the accompanying drawings in which:

FIGURE 5 is an equivalent circuit diagram of the storage matrix of FIGURE 3;

FIGURE 6 is a schematic circuit diagram showing the relationship between the selection circuitry, the storage cards, and the read-out circuitry of an embodiment of the invention;

FIGURE 7 is a truth table illustrating the operation of the selection circuitry;

Figure 1:
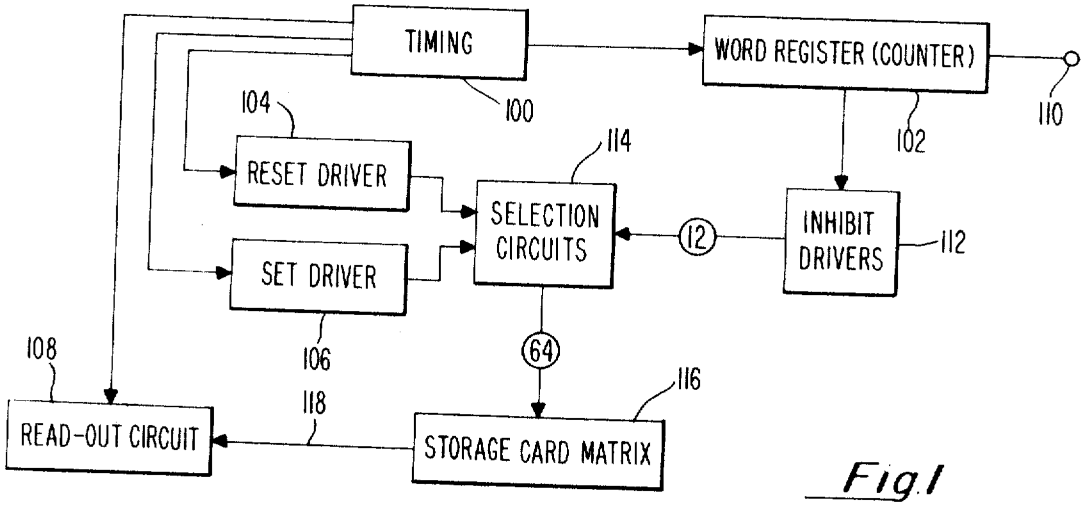
FIGURE 1 is a block diagram of a memory which may include an embodiment of the invention.

In FIGURE 1 a block diagram of a memory embodying the invention is shown having a source of timing signals 100 which is electrically connected to a word register 102, to a reset driver 104, to a set driver 106, and to a read-out circuit 108 so as to provide timing pulses to synchronize the circuits. A source of timing signals 100 may be of any conventional type such as an astable multivibrator.

The word register 102 is a binary counter having an input terminal 110 into which address pulses are applied to determine which word of the storage card is to be read out. The word register 102 is electrically connected to the inhibit drivers 112. The outputs of the inhibit drivers 112, the reset driver 104, and the set driver 106 are each electrically connected to the selection circuits 114 which decode the binary output from the word register 102 so as to select one line of the matrix which is included in a storage card 116. The inhibit drivers 112 are electrically connected to the selection circuits 114 through 12 lines shown schematically by a single line and a circle including the number 12. The selection circuits 114 are electrically connected to the storage card matrix 116 through 64 wires. These selection circuits read out one word in response to an address set in the word register 102. This word is read out into the read-out circuit 108 through the lines 118 which electrically connect the card storage matrix 116 to the read-out circuit 108.

The storage card matrix 116 consists essentially of orthogonal rows of word (drive) lines and sense lines separated by a storage card. The card provides storage by allowing more or less capacitive coupling between the word and sense lines at their intersections. Each intersection of a word line with a sense line represents one bit of information. The word lines and the sense lines may be permanently fixed with the memory and the storage cards may be replaceable so as to provide different information.

Figures 2, 3, 4:
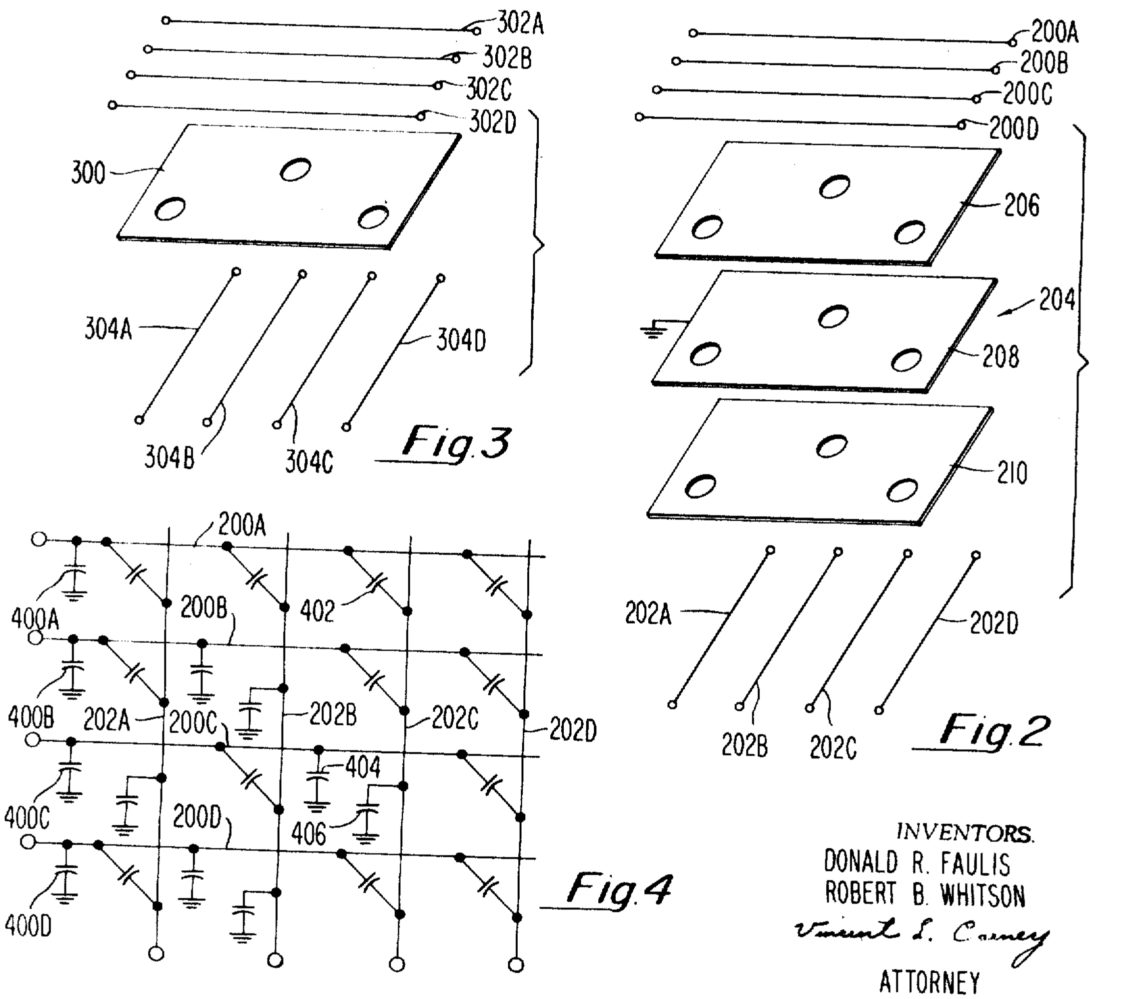
FIGURE 2 is an exploded diagrammatic drawing of a storage matrix consisting of drive lines, an information card, and sense lines, which may be part of an embodiment of the invention.
FIGURE 3 is an exploded diagrammatic drawing of another type of storage card which may be part of an embodiment of the invention and the card's drive and sense lines.
FIGURE 4 is an equivalent circuit diagram of the storage matrix of FIGURE 2.

A diagrammatic view of one type of storage card matrix is shown in FIGURE 2 having four word lines 200A–200D and four sense lines 202A–202D. The word lines and the sense lines may be plated on a printed circuit board. The information card 204 includes three separate layers 206, 208, and 210. The center sheet 208 is a metallic conductor which is grounded. The sheets 206 and 210 which are on either side of the center sheet 208 are each formed of insulating material. The sense lines are capacitively coupled to the word lines wherever a hole is punched in the information card 204, but are not coupled at intersections where no hole is punched since coupling is prevented by the shield 208.

In FIGURE 3 another type of information card is shown. The information card is a single sheet of high dielectric material 300 in which holes are punched so as to provide less capacitive coupling at these locations between the word lines 302A–302D and the sense lines 304A–304D.

In FIGURE 4 an equivalent circuit diagram of the conductive-shield type storage-card matrix is shown having the word lines 200A–200D and the sense lines 202A–202D. The distributed capacitance between each of the word lines 200A–200D and ground is represented by a corresponding one of the four capacitors 400A–400D each having one plate connected to a corresponding word line and the other plate grounded. Physically these represent the capacitance between the word lines and the grounded shield shown as 208 in FIGURE 2. The capacitive coupling between the word lines and the sense lines wherever a hole is punched in the information card is illustrated by a capacitor such as 402 which has one plate electrically connected to the word line 200A and the other plate electrically connected to the sense line 200C. At intersections of the word lines and the sense lines where no hole is punched in the card there is unavoidable additional capacitance between these lines and ground since they are closer to the ground shield. In the equivalent circuit of FIGURE 4 this additional capacitance at an intersection where no hole is punched such as that intersection between word line 200C and sense line 202C has been illustrated as a capacitor having one plate electrically connected to the word line and the other plate grounded such as capacitor 404 and by a capacitor having one plate connected to a sense line and the other plate grounded such as capacitor 406.

In FIGURE 5 an equivalent circuit diagram of the punched dielectric type of storage card matrix of FIGURE 3 is shown having word lines 302A–302D and sense lines 304A–304D. The capacitance between the word lines and ground is shown by the four capacitors 500A–500D, each having one plate attached to a corresponding one of the word lines 302A–302D and each having its other plate grounded. In the equivalent circuit diagram of FIGURE 5 a coupling capacitor is shown having one plate electrically connected to a word line and the other plate connected to a sense line at each of the intersections of the word lines 302A–302D and the sense lines 304A–304D. This is because there is a coupling capacitance at both the punched and unpunched locations. The storage card matrix of FIGURE 3 does not have a ground shield such as 208 in the storage card matrix of FIGURE 2. However, the coupling capacitance takes on a different value for binary "one" locations having a hole punched through the information card and for binary "zero" locations where no hole was punched in the information card. The capacitance of an intersection at a punched location is proportional to a dielectric constant of unity whereas the capacitance at an unpunched location is proportional to a dielectric constant which is greater than unity.

In FIGURE 6 a schematic circuit diagram is shown illustrating the connections between the selection circuits shown in the block diagram 114 in FIGURE 1 and a storage card matrix shown in the block diagram 116 in FIGURE 1. The storage-card matrix of FIGURE 6 is a four word, four bit per word card. However, it is clear that other size cards may be used.

The selection circuits include four ferromagnetic cores 600A–600D; one core for each word in the storage-card matrix. The cores are either threaded or bypassed by the four lines 602A–602D from the inhibit drivers illustrated as 112 in FIGURE 1. In the selection circuit of FIGURE 6 inhibit line 602A threads cores 600A and 600C and bypasses cores 600B and 600D; inhibit line 602B threads cores 600B and 600D and bypasses cores 600A and 600C; inhibit line 602C threads cores 600A and 600B and bypasses cores 600C and 600D; and inhibit line 602D threads cores 600C and 600D and bypasses 600A and 600B. A conductor from the output of the set driver shown as 106 in FIGURE 1 threads each of the cores as does the conductor from the reset driver shown as 104 in FIGURE 1. The conductor from the set driver 106 has one turn on each of the cores while the reset driver 104 has five turns. Four ten-turn output windings 604A–604D are each wound around a corresponding one of the cores 600A–600D.

The direction of the current in the lines from the inhibit drivers, the set driver and the reset driver are indicated by arrows. The inhibit drivers 112 apply currents to each of the cores 600A–600D excepting the core which is selected for read out. The set driver 106 then switches to the one polarity each of these cores which are not inhibited. The reset driver 104 then switches the "set" core back generating a negative voltage in the winding 604A, for example. This negative voltage is used for read out purposes in the storage-card matrix. The details of construction of the selection circuits are provided in the copending application of Eugene T. Walendziewics, Ser. No. 233,068, filed Oct. 25, 1962, and assigned to the same assignee.

One end of each of the four output windings of the selection circuit 604A–604D is electrically connected to the cathode of a corresponding one of the four diodes 606A–606D. The anode of each of the four diodes 606A–606D is electrically connected to a corresponding one of the word lines 608A–608D of a storage card matrix. The other end of each of the four output windings 604A–604D of the selection circuit are electrically connected to the positive output of a one volt D.C. bias source 610; the negative output of the bias source 610 is electrically connected to each of the word lines 608A–608D through a different one of the corresponding 1K (kilo-ohm) resistors 612A–612D.

A read out circuit indicated as 108 in FIGURE 1 has the four sense lines 614A–614D from the storage-card matrix electrically connected to it. Capacitors are shown electrically connecting the word lines and the sense lines at each intersection excepting for two: the intersection of word line 608B and sense line 614A and the intersection of word line 608C with sense lines 614B. This indicates that the storage-card matrix has a hole punched in it at each intersection excepting for these two so that a binary "one" has been stored at each intersection of the card excepting for two and that the binary "zero" has been stored as the first bit (614A) of the second word (608B) and as the second bit (614B) of the third word (608C).

It can be seen that each of the words are read out with the bits in parallel in response to a negative pulse generated on one of the output windings 604A–604D when the cores are switched by pulses from the reset driver 104. Pulses generated when the cores are switches by the set driver 106 are always positive and are therefore blocked by the diodes 606A–606D.

In FIGURE 7 a table is given correlating the relationship between the input and the outputs of a selection circuit. In the horizontal column the possible combinations of inhibit currents from the inhibit drives 112 on the lines 602A–602D that select one of the four word lines 608A–608D are shown. In a vertical column the word line on which an output appears is indicated as A, B, C, and D representing the corresponding word lines 604A–604D. The zeros and ones in the table represent binary "zero" and binary "ones"; the "zero" being no current and the "one" being a current in the direction of the arrows on the lines 602A–602D. For example, if the input pulses from the inhibit line are as indicated on the top row such that there is no current output from line 602A, there is a negative current pulse on line 602B, there is no current output on line 602C and there is a negative current output on line 602D, the word line 604A will receive a negative pulse when the core 600A is switched by the rest driver 104. This negative pulse will cause four bits to be read from the word line 608A which in this case is four binary "one" signals.

Figure 8:
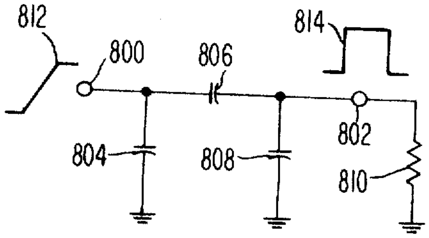
FIGURE 8 is an equivalent circuit diagram of the memory card and read-out circuit illustrating an embodiment of the invention.

In FIGURE 8 an equivalent circuit showing the coupling between a word line and a sense line is shown having an input terminal 800 which receives a read-out pulse from one of the cores in the selection circuit 114 and having an output terminal 802 which either delivers a pulse to the sensing amplifiers or does not deliver a pulse. If a pulse is delivered the read out circuitry will register a binary "one." If no pulse is delivered, the read-out circuitry 108 will register a binary "zero." A capacitor 804 has one plate electrically connected to terminal 800 and has its other plate grounded. This capacitor in the equivalent circuit of FIGURE 8 represents the capacitance between the word conductor and ground. In an operating circuit using the storage card matrix shown in FIGURE 2, this capacitor may have a value of 193 picofarads. Another capacitor 806 has one plate electrically connected to the terminal 800 and its other plate electrically connected to the terminal 802. This capacitor represents the coupling between the word line and the sense line at an intersection of the two where a hole indicating a binary "one" has been punched in the information card. A typical value for this capacitor would be 0.39 picofarad. Still another capacitor 808 has one plate electrically connected to the terminal 802 and has its other plate grounded. This capacitor represents the capacity between the sense lines and ground. A representative value for this capacitor would be 125 picofarads. Also a resistor 810 is electrically connected between the terminal 802 and ground. This resistor represents the input impedance of the read-out circuits. A typical valve for this resistor would be 150 ohms.

The input voltage applied to terminal 800 from the selection circuits is in the form of a ramp shown by the curve 812. A typical peak value for this voltage is 30 volts. Since a binary "one" has been stored on the card so as to provide the 0.39 picofarad capacitance, this voltage ramp is differentiated by the action of the capacitor 806 and the resistor 810. The current output takes the form shown in the curve 814. This current output gives a positive indication of the storage in the storage-card matrix. The use of differentiation technique for read-out provides an output signal in the read-out circuit, the amplitude of which may be as much as a hundred times that which would be obtained if a bridge technique had been used. This is because the measurement would otherwise have to be made across the bridge formed by the capacitors 806 and 808. Since the capacity of the capacitor 808 is more than a hundred times that of the capacitor 806, much of the output would be lost.

Figure 9:
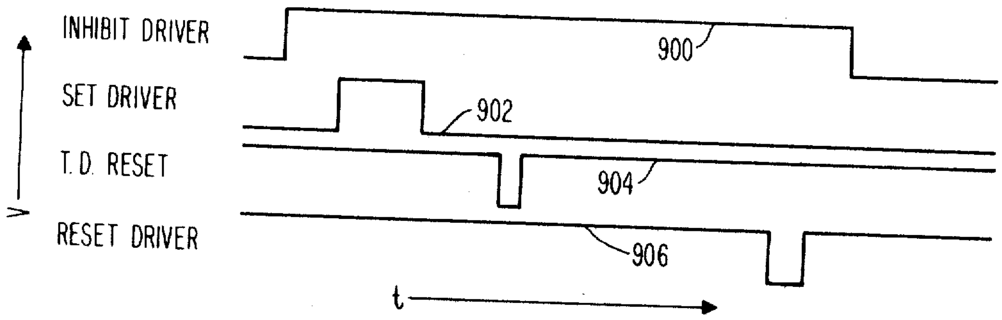
FIGURE 9 is a graph showing the timing of various voltage pulses necessary for the operation of the circuit of FIGURE 1.

In FIGURE 9 a timing diagram for the operation of the memory is shown having four curves, each having individual ordinates of voltage and having common abscissas of time. The curve 900 represents the inhibit pulse which is applied by the inhibit driver to the selection circuitry. Its rising edge occurs two microseconds from the leading edge of the clock pulses (not shown) from the timing pulse generators indicated as 100 in FIGURE 1. It rises from zero volts to a positive 36 volts and continues at this amplitude for thirty microseconds before falling back to zero volts.

The curve 902 is the set pulse applied by the set driver 106 to the selection circuits 114. It is shown as rising five microseconds from the leading edge of the clock pulse. It rises from zero volts to a positive 36 volts and continues at this voltage for 4.5 microseconds before returning to zero volts. The curve 904 which is directly under the curve 902 is a reset curve which is applied to the read out circuitry and resets the memory tunnel diode contained therein. It occurs 11.5 microseconds after the leading edge of the clock pulse. It falls from zero volt to a negative 26 volts and continues at this voltage for 0.1 microsecond before returning to zero volt. The curve 906 is a reset pulse applied by the reset drivers 104 to the selection circuits so as to generate the pulse for read-out. This pulse occurs 29.5 microseconds from the leading edge of the clock pulse (not shown). It falls from zero volt to negative 33 volts continuing at this potential for 0.2 microsecond before returning to zero volt.

Figure 10:
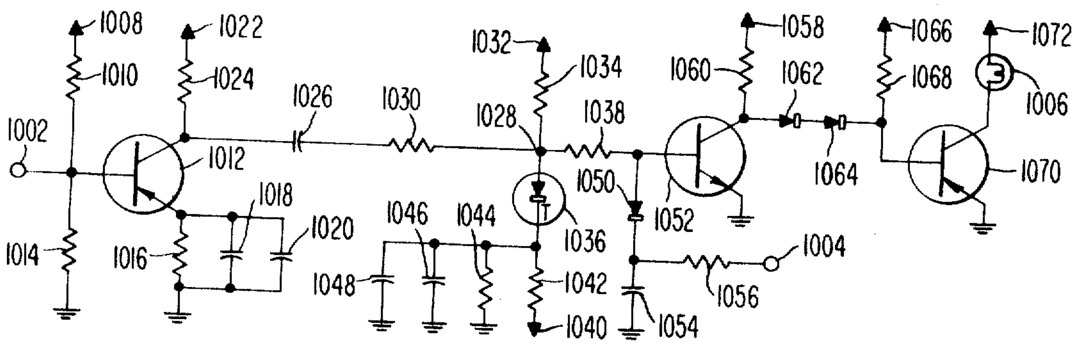
FIGURE 10 is a schematic circuit diagram of the read-out circuitry which is part of an embodiment of the invention.

In FIGURE 10 one of the read out circuits is illustrated. Each of the sensing lines is electrically connected to one such circuit through a terminal 1002. The tunnel-diode reset pulses are applied to a terminal 1004 and resets each unit in preparation for the reading end of the next word. A binary "one " applied to the terminal 1002 is stored by this circuit and indicated on the lamp 1006.

The input terminal 1002 is electrically connected to a source of a negative 6 volts 1008 through a 200-ohm resistor 1010, to the base of the PNP, 2N711 transistor 1012, and to ground through a 600-ohm resistor 1014.

The transistor 1012 is of the PNP type having its emitter grounded through the parallel combination of a 1K resistor 1016, a 1 microfarad capacitor 1018, and a 2200-pf. (picofarad) capacitor 1020. The collector of the transistor 1012 is electrically connected to a source of a negative 15 volts 1022 through 2K resistor 1024 and to one plate of the 910-pf. capacitor 1026. The other plate of the capacitor 1026 is electrically connected to the terminal 1028 through the 200-ohm resistor 1030.

This transistor circuitry provides a stage of amplification prior to the read-out circuit memory. Additional stages of amplification may be used if necessary. The common emitter configuration of the transistor is used to provide a low input impedance necessary for the differentiation of the read-out pulse when it is applied to an intersection of the information card that is punched so as to provide a capacitance.

The terminal 1028 is electrically connected to the source of a positive 40 volts 1032 through the 43.2K resistor 1034, to the anode of the 1 milliampere tunnel diode 1036 and to one end of the 100-ohm coupling resistor 1038. The cathode of the tunnel diode 1036 is electrically connected to a source of a negative 6 volts 1040 through the 1K resistor 1042 and is electrically connected to ground through the parallel combination of a 1 ohm resistor 1044, a one thousand pf. capacitor 1046 and a 25-microfarad capacitor 1048.

The tunnel diode 1036 is biased so as to be bistable. It serves as a threshold device and as a storage device. When the input from the previous amplifying stage indicates a current amplitude representative of a binary "one," the tunnel diode 1036 switches from its stable high-current low-voltage state to its stable low-current high-voltage state. It remains in this state until it is reset. While it is in this state it provides an indication to the indicator part of the read-out circuit which provides a visible indication that a binary "one" has been read out of the memory.

The other end of the resistor 1038 is electrically connected to the anode of the 1N144 diode 1050 and to the base of the NPN, 2N385 transistor 1052. The cathode of the diode 1050 is electrically connected to ground through the 360 pf. capacitor 1054 and to the reset terminal 1004 through the 10K resistor 1056. The emitter of the transistor 1052 is grounded. Its collector is electrically connected to a source of a positive 6 volts 1058 through the 2.4K resistor 1060 and to the anode of 1N144 diode 1062. The cathode of the diode 1062 is electrically connected to the anode of the 1N144 diode 1064; the cathode of the diode 1064 is electrically connected to a source of a negative 6 volts 1066 through the 5K resistor 1068 and also the base of the PNP, 2N404 transistor 1070. The emitter of the transistor 1070 is grounded and its collector is electrically connected to the source of a negative 6 volts 1072 through the lamp 1006.

When the tunnel diode 1036 is in its low-current high-voltage state indicating that a binary "one" has been read out of the storage card matrix, the transistors 1052 and 1070 provide a voltage output which causes the lamp 1006 to light. Before another word is read out of the card storage matrix, the reset pulse indicated as curve 904 in FIGURE 9 is applied to terminal 1004. This resets the tunnel diode 1036 back to its low-voltage high-current state causing the lamp 1006 to be extinguished.

Figure 11:
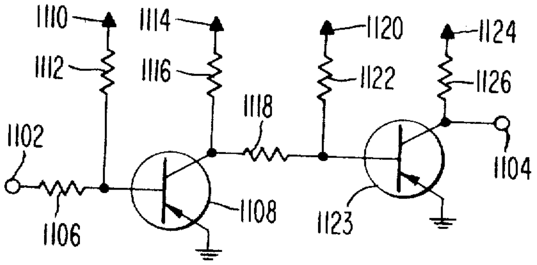
FIGURE 11 is a schematic circuit diagram of a set driver which may be utilized in an embodiment of the invention.

In FIGURE 11 a schematic circuit diagram of the set driver shown as 106 in FIGURE 1 is shown having an input terminal 1102 adapted to receive positive 30-volt clock pulses from the timing circuit indicated as 100 in FIGURE 1 and having an output terminal 1104 for providing positive 36-volt output pulses to the selection circuits indicated as 114 in FIGURE 1. The input terminal 1102 is electrically connected to one end of a 2.7K resistor 1106; the other end of the resistor 1106 is electrically connected to the base of the PNP, 2N404 transistor 1108 and to a source of a negative six volts 1110 through a 910-ohm resistor 1112. Its emitter is grounded and its collector is electrically connected to a source of a negative 25 volts 1114 through the 240-ohm resistor 1116 and to one end of the 120-ohm coupling resistor 1118.

The other end of the coupling resistor 1118 is electrically connected to a source of positive 6 volts 1120 through the 330-ohm resistor 1122 and to the base of the PNP, 2N428 transistor 1123. The emitter of the transistor 1123 is grounded and its collector is electrically connected to a source of a negative 12 volts 1124 through the 30-ohm resistor 1126 and also to the output terminal 1104.

The set driver is a two-stage transistor logic circuit capable of delivering 400 milliamperes with a rise time of about 1 microsecond to a 1-turn winding on the cores of the selection circuitry.

Figure 12:
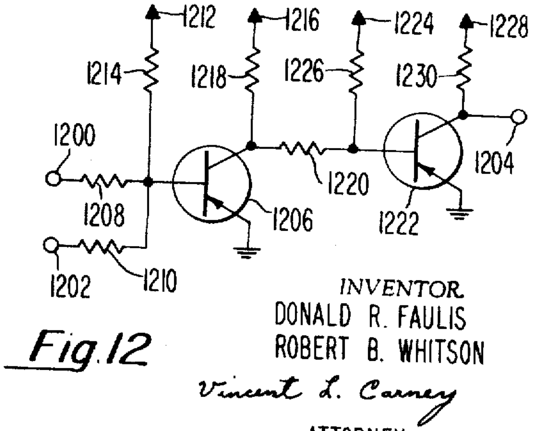
FIGURE 12 is a schematic circuit diagram of an inhibit driver which may be utilized in an embodiment of the invention.

In FIGURE 12 a schematic circuit diagram of an inhibit driver such as those indicated by the number 112 in FIGURE 1 is shown having an input terminal 1200 for receiving positive 40-volt timing pulses, an input terminal 1202 for receiving selection pulses from the word register 102 which pulses rise from a negative 25 volts to zero volt, and having an output terminal 1204 for providing a positive 36-volt inhibit pulse to the selection circuits 114. The base of a PNP, 2N404 transistor 1206 is electrically connected to the terminal 1200 through a 4.7K resistor 1208, to terminal 1202 through a 3.9K resistor 1210 and to a source of a negative 6 volts 1212 through a 910-ohm resistor 1214. The emitter of the transistor 1206 is grounded and its collector is electrically connected to a source of a negative 25 volts 1216 through a 240-ohm resistor 1218 and to one end of the 120-ohm coupling resistor 1220. The other end of the resistor 1220 is electrically connected to the base of the PNP, 2N428 transistor 1222 and to a source of a positive 6 volts 1224 through a 330-ohm resistor 1226. The emitter of transistor 1222 is grounded and its collector is electrically connected to a source of a negative 12 volts 1228 through the 30-ohm resistor 1230 and to the output terminal 1204.

The inhibit driver is similar to the set driver shown in FIGURE 11. It is also capable of delivering 400 milliamperes with a rise time about 1 microsecond. However, two inputs are required for the operation of the inhibit driver. One input selects inhibit drivers in accordance with binary coded word register as shown at 102 in FIGURE 1; the other input is a 20-microsecond timing pulse to bracket the set driver timing.

Figure 13:
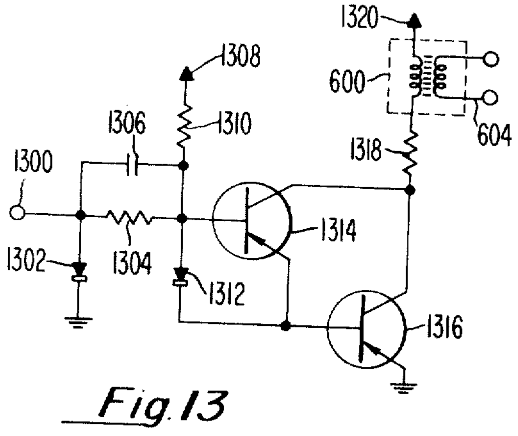
FIGURE 13 is a schematic circuit diagram of a reset driver which may be utilized in an embodiment of the invention.

In FIGURE 13 a schematic circuit diagram of one of the reset drivers 104 in FIGURE 1 is shown having an input terminal 1300 for receiving clock pulses from the timing circuit indicated as 100 in FIGURE 1 and being electrically connected to a core 600 in the selection circuitry. The input terminal 1300 is electrically connected to the anode of a 1N144 diode 1302, to one side of the 3.9K resistor 1304, and to the plate of the 51 pf. capacitor 1306. The cathode of the diode 1302 is grounded; and the other end of the resistor 1304 and the other plate of the capacitor 1306 are each electrically connected to a source of positive 6 volts 1308 through a 12K resistor 1310, to the anode of a 1N144 diode 1312, and to the base of the PNP, 2N598 transistor 1314. The cathode of the diode 1312 is electrically connected to the emitter of the transistor 1314, and to the base of a PNP, 2N1495 transistor 1316. The emitter of the transistor 1316 is grounded. The collector of the transistors 1314 and 1316 are each electrically connected to one end of a 20-ohm resistor 1318. The other end of the resistor 1318 is connected to a source of a negative 25 volts 1320 through a five turn reset winding on a core 600 of the selection circuitry. This core 600 also has a ten turn winding 604 upon it that is connected to the storage card matrix.

The reset driver is required to deliver approximately 1 ampere to the cores 5-turn winding in about 40 nanoseconds. To do this the reset driver provides a negative 33-volt output for 5.5 microseconds.

It can be seen that the invention provides a practical semi-permanent memory which is inexpensive and yet provides a strong read-out signal which can be easily distinguished from noise. The punched card technique provides a low cost reliable means of providing storage and retrieval of fixed information and has a facility for manually altering the information by the interchange of the storage documents.

Obviously, many modifications and variations of the present invention are possible in the light of the above teachings. It is therefore to be understood that within the scope of the appended claims, the invention may be practiced otherwise than as specifically described.

What is claimed is:

1. The combination comprising:

information storage means for storing information in a code including a first signal at one of a plurality of locations represented by a predetermined range of reactance;

threshold sensitive indicating means for indicating which of said locations have stored said first signal;

read-out means, electrically connected to said information storage means and to said indicating means, for obtaining a differentiated signal pulse from those locations of said information storage means having said predetermined range of reactance, whereby said locations having stored said first signal are detected, comprising:

address means, electrically connected to said information storage means, for selectively applying substantially linear ramp voltage pulses to a selected one of said locations; and impedance means, electrically connected to said information storage means, for obtaining a substantially constant current output of a predetermined differentiated amplitude from said information storage means when said selected location exhibits said predetermined range of reactance.

2. The combination according to claim 1 in which said indicating means comprises:

threshold means, electrically connected to said read-out means, for detecting said differentiated signal pulse;

bistable means, electrically connected to said threshold means, for assuming a predetermined one of two impedance states in response to the detection of a differentiated pulse by said threshold means; and display means, electrically connected to said bistable means, for providing a sensible signal indicating the presence of said predetermined one of said states of said bistable means.

3. A semi-permanent memory comprising:

a plurality of parallel word conductors;

a plurality of parallel sense conductors orthogonal to said word conductors and lying in a plane parallel to and adjacent to the plane in which said word conductors lie;

said parallel word conductors and said parallel sense conductors being adapted to have a dielectric card placed between them with binary information punched in said card in the form of holes capable of providing coupling capacitance between said word lines and said sense lines so that a binary "one" and a binary "zero" may be indicated by the presence or absence of said punched hole;

selection means, electrically connected to said word lines, for applying a substantially linear ramp voltage pulse to a selected word line, whereby one word of said memory may be chosen to read out;

a plurality of low input-impedance amplifiers;

each of said low input-impedance amplifiers being electrically connected to a different one of said sense lines;

the input impedance of each of said low input-impedance amplifiers having such a value that the time constant between one of said coupling capacitances in said card and said low-input impedance of said amplifier together is small compared to the period of said voltage pulses applied to said word conductors, whereby said coupling capacitances and said low-input impedance amplifiers form a resistor-capacitor differentiating circuit;

a plurality of threshold sensitive bistable devices, each of said bistable devices being electrically connected to a different one of said low input-impedance amplifiers;

a plurality of display means for indicating the impedance state of said bistable devices;

each of said display means being electrically connected to a different one of said bistable devices, whereby said display means will indicate the binary information in a word selected by said selection circuitry.

References Cited

UNITED STATES PATENTS

| | | | |
|---|---|---|---|
| 3,038,660 | 6/1962 | Honnell et al. | 235—180 |
| 3,123,706 | 3/1964 | French | 235—61.11 |
| 3,131,291 | 4/1964 | French | 235—61.11 |

ROBERT C. BAILEY, *Primary Examiner.*

R. M. RICKERT, *Assistant Examiner.*